Nov. 17, 1925.
F. M. SCHULER
ARTICLE FEEDING DEVICE
Filed May 8, 1922
1,562,063
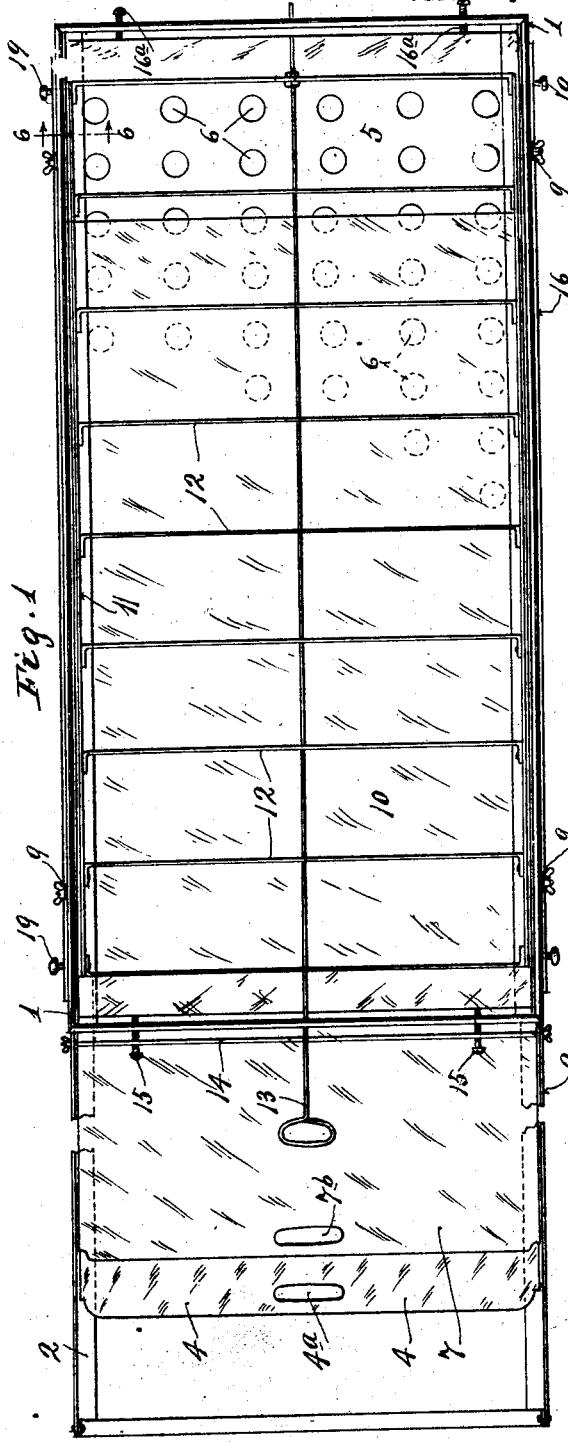
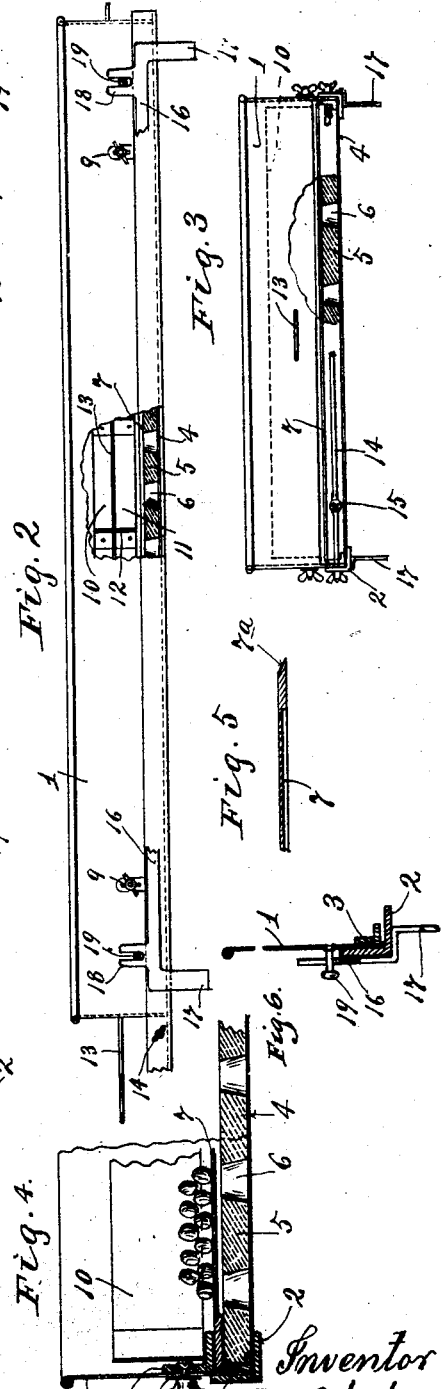
Inventor
F. M. Schuler
By his Attorney
James F. Williamson Patented Nov. 17, 1925.

1,562,063

UNITED STATES PATENT OFFICE.

FRANK MATT SCHULER, OF WINONA, MINNESOTA.

ARTICLE-FEEDING DEVICE.

Application filed May 8, 1922. Serial No. 559,261.

*To all whom it may concern:*

Be it known that I, FRANK MATT SCHU-LER, a citizen of the United States, residing at Winona, in the county of Winona and State of Minnesota, have invented certain new and useful Improvements in Article-Feeding Devices; and I do hereby declare the following to be a full, clear, and exact description of the invention, such as will enable others skilled in the art to which it appertains to make and use the same.

This invention relates to a small article feeder or dropper adapted to place or feed a plurality of articles at one time. The invention is particularly adapted to such a device adapted to feed small pieces of fruit or nuts to molds containing cream or fondant therein, which molds or starch impressions receive the nuts or fruit. The device is capable of use in making practically all kinds of candy or candy bars which contain fruit, nuts or similar pieces of material.

It is an object of this invention to provide such a feeding device in which large pieces of fruits or nuts can be simultaneously fed to a large number of molds or starch impressions.

It is a further object of the invention to provide such a device comprising a hopper having a perforated member therein adapted to receive the nuts or fruit and having an imperforate slide below also preferably above said member which can be alternately placed in position and removed.

It is a further object of the invention to provide such a hopper with means for supporting an agitating means and guiding the top imperforate plate, which means is capable of being supported in various positions so that perforate members of different thicknesses may be used.

It is a further object of the invention to mount the hopper upon a guiding means which projects at one end thereof and forms a support for the slidable imperforate plates above mentioned.

These and other objects and advantages of the invention will be fully set forth in the following description made in connection with the accompanying drawings in which like reference characters refer to the same parts throughout the different views, and in which Fig. 1 is a plan view of the device;

Fig. 2 is a partial view in side elevation thereof, a portion thereof being shown in section;

Fig. 3 is an end view of the device partly in section;

Fig. 4 is a vertical section through one side of the hopper;

Fig. 5 is a partial sectional view of the top imperforate plate; and

Fig. 6 is a vertical section taken on the line 6—6 of Fig. 1.

Referring to the drawings, the device comprises a hopper member shown as made of sheet metal having the usual bead at its upper edge. This hopper is supported by spaced angle members 2 which project a considerable distance at one end thereof having their vertical sides extending along the outside of said hopper and their horizontal sides projected inwardly thereof. Secured to the inside of the hopper just above the angle members 1 are small angle members 3 and the space between the horizontal portions of the angle members 2 and 3 forms a guideway for an imperforate plate 4 supported on the angle members 2 and adapted to slide thereon. This plate is provided with a hand hold 4$^a$ at its front end and is adapted to slide under the hopper and from beneath the same at one end thereof. Supported upon the angle members 3 is a perforated member tray or board 5 formed with rows of perforations 6 therein shown as of cylindrical shape flaring downwardly at their lower ends. This board is notched at its sides to fit over the horizontal portions of the angles 3, and the same rests thereon and is supported in close proximity to the plate 4. Supported above the board 5 in contact with the edges thereof is another imperforate plate 7 which, as shown in Fig. 5, is formed with a sharpened beveled edge 7$^a$ at its front end and is also recessed, as shown on its under surface, so that it only contacts with the member 5 at its side and front edges. This member is, likewise, provided with a hand hold 7$^b$ at its front end. Above the plate 7, angle members 8 are secured to the sides of the hopper 1 and form, with the board 5, a guideway for the plate 7. A plurality of plates 9 project upwardly from the angle members 2 along the sides of the hopper to reinforce the same and these members and the hopper are provided with vertically extending slots through which project threaded bolts or screws secured to the angle members 8, these bolts or screws being provided with clamping wing nuts outside of the hopper. The angle members 8 can thus be moved vertically and clamped in different positions and boards or perforated members 5 of different thicknesses may be used. Supported upon the angle members 8 is an agitating member 10 comprising side members 11 and transverse flat plate members 12 extending therebetween at regular spaced intervals. The member 10 is provided with a manipulating member 13 comprising a rod extending through the members 12 and fastened to the inner end 1 of said members and projecting at the front end of the hopper where it is formed as a handle, and also projecting through the rear of the hopper. A rod 14 extends between the angle members 3 to which it is clamped just in front of the hopper 1 and has screws 15 projecting therefrom through the front wall of the hopper against the front of the board 5. Screws 16 also project through the rear of the hopper against board 5.

In the use of the device the same will be attached to the candy machine to extend transversely over a table thereon, on which table will be supported starch boards with molds or starch impressions which impressions may or may not have cream or fondant therein, which molds or starch impressions in rows similar to the rows of the holes 6 so that material dropping through the holes 6 will drop directly into the molds or starch impressions. A mold or starch board placed in position and the corresponding perforate member 5 placed in the hopper, the plate 4 will be moved under the hopper and the plate 7 moved out of the end of the hopper. It will be understood that the member 5 approximately fits within the side walls of the hopper. The agitating member 10 will now be manipulated and the pieces of fruit, such as cherries, or the nuts will drop into the perforations 6. After a very short time all of these perforations will contain one of the articles and the plate 7 will then be moved into the hopper, the sharpened edge thereof traveling in close engagement with the top surface of the member 5. After the plate 7 is in position, the plate 4 will be withdrawn at the end of the hopper and the articles of fruit or pieces of nuts will drop into the molds placed in position beneath the same. The plate 4 can then be re-inserted into the hopper and the feeder will be ready to repeat the operation with a different mold or starch board containing into which nuts or fruit are to be dropped. The rod 14 and screws 15 prevent the withdrawal of the board 5 when the plates 5 and 7 are drawn outwardly and the screws 15 and 16ª can be adjusted to prevent end play of the board 5 and to aline the same accurately with the mold or starch impressions if necessary.

The feeding device, as a whole, is supported in a frame comprising side members 16 suitably connected together and having depending legs 17. The side members 16 are provided with bifurcated upstanding lugs 18 and bolts 19 projecting from each side of the hopper 1 adjacent its end portions and are adapted to rest in the slot between the bifurcations or members 18. The feeding device can thus be quickly and easily supported in the desired location on the candy machine. If necessary or desirable, the front end can be raised by taking hold of the angle members 2 or their end connection and raising the same. The device will then pivot about the rear bolts 19. The device can then be let drop and the front bolts 19 will drop into place. The resulting jar will return in discharging the articles from the holes 6 in the board 5 so that the said articles will drop into the molds or starch impressions beneath. This jarring action may be repeated, if necessary and will be used when the articles being handled are sticky and tend to stick in the holes 6.

From the above description it is seen that applicant has provided a very simple and efficient feeder or distributor for the purpose intended. It will be noted that the plate 7, as stated, only touches the member 5 at the front and side edges and this feature greatly assists in preventing the board and plate from becoming gummed up in the operation of the device. The distributor does the work of a great many operators, as it has been customary to place the fruit or nuts in the molds or starch impressions by hand. In the hand method, the fingers of the girls usually employed often touch the edges of the starch impression and these being soft were dented and damaged. This trouble is eliminated by this invention. The machine further drops a uniform amount of material into the molds, while in the hand work this amount had a great variation. The molds or starch impressions with or without cream or fondant can, of course, be brought under the feeder in any desired manner, being either placed thereunder on a table or movable thereunder by an intermittent conveyor. A plurality of boards 5 and the molds will, of course, be used which will always correspond. The flaring shape of the holes 6 in the board 5 facilitates the passage of the material therethrough and prevents the sticking of the same. The shape of the holes will, of course, be varied in accordance with the kind of candy being made, these holes being often rectangular for candy bars or being oblong for other differently shaped pieces of candy. It may be stated that the feeder is also used for making candy bars having alternate layers of candy and fruit or nuts, The lower edge of the cutting plate 7 at its front edge which comprises the knife 7ª should be in contact with the perforate board 5 for a distance of two inches so that when cutting fruit or nuts as it is being inserted into the hopper, the fruit or nuts will be cut before the contact portion of the knife passes the hole in perforate board 5. This is to prevent fruit and nuts working in under the plate 7 where it is not in contact with perforate plate 5.

It will, of course, be understood that various changes may be made in the form, details and arrangement of the parts without departing from the scope of applicant's invention, which, generally stated, consists in the matter shown and described and set forth in the appended claims.

What is claimed is:

1. An article feeder having in combination a hopper having an open bottom, guide means on which the hopper is supported extending at one end thereof, an imperforate plate supported on said means and slidable into and out of position beneath the hopper, a perforated member supported in said hopper above said plate, a second imperforate plate supported on said perforated member and slidable into and out of position in said hopper, and an agitating means in said hopper above said second mentioned plate.

2. The structure set forth in claim 1, and means supported at the sides of said hopper forming a guide means for said second mentioned plate and a support for said agitating means, and means for clamping said supporting means in a plurality of different positions to accommodate perforate members of different thicknesses.

3. An article feeding device having in combination, a hopper having an open bottom, guide means on which the hopper is supported extending at one end thereof, a member supported on said hopper above said guide means, an imperforate plate slidable in and out of the end of said hopper between said members and said guide means, a perforated member supported on said members, and an imperforate plate having a sharpened front edge supported on said perforated member and slidable in and out of the front end of said hopper.

4. An article feeding device having in combination, a rectangular hopper having an open bottom, spaced angle members between the vertical sides of which the hopper is supported, extending at one end of the hopper and having inwardly directed horizontal portions, angle members secured to the inner sides of the hopper adjacent said angle members, an imperforate plate slidable between said angle members and supported on the first mentioned angle members, a perforated member supported at its sides on its second mentioned angle members, and an imperforate plate slidable on said perforated member into and out of the hopper, and vertically adjustable angle members secured to the sides of the hopper having their horizontal portions immediately above said second mentioned imperforate plate.

5. The structure set forth in claim 4, and an agitator comprising spaced transverse bars supported on said last mentioned angles and reciprocable in the hopper.

6. A device for simultaneously feeding a plurality of separate articles distributed over a comparatively large area to a candy making machine having in combination, a hopper adapted to receive a mass of said articles, a flat board of comparatively small thickness having a multiplicity of comparatively small apertures therethrough supported adjacent the bottom of said hopper, said hopper having a depth several times the diameter of one of said apertures and said apertures being in communication with said mass of articles and said apertures being adapted to receive said articles, a thin imperforate plate slidable under said board to support the articles deposited in said apertures and means for separating said articles in the hopper from those entering said aperture.

7. A device for feeding separate articles spaced over a comparatively large area to a candy making machine comprising a hopper having an open lower end and adapted to receive a mass of said articles, a supporting means in said hopper, a comparatively thin flat board having a multiplicity of apertures therethrough resting on said supporting means and extending over substantially the entire area of said hopper, with said apertures in communication with said mass, said hopper having a depth several times the diameter of one of said apertures, a plate adapted to be slid into said hopper below said board, and movable means in said hopper for causing the articles or materials to enter the apertures in said board.

8. An article or material feeding device for a candy making machine comprising a hopper, spaced oppositely disposed supporting members disposed beneath and projecting at one end of the hopper and secured thereto, supporting means in said hopper, a removable perforated board supported on said means and a plate at the bottom thereof slidable in and out of the end of said hopper and adapted to be supported on said supporting members, said hopper being adapted to be raised and dropped to cause ejection of the articles or material in the apertures of said board.

9. An article feeding device for a candy making machine comprising a hopper adapted to contain the said articles, a board having a multiplicity of perforations in said hopper, a removable supporting means beneath said board, means for separating the articles in said perforations from the articles in said hopper, spaced supporting bars having inwardly disposed substantially horizontal flanges secured to said hopper and extending forwardly from said hopper, means connecting said bars adjacent their forward ends whereby said bars can be used as a handle to tip said hopper back and forth to cause the articles therein to roll back and forth on said board.

10. A feeding device having in combination a hopper adapted to contain a multiplicity of articles, a member therein having means to receive a plurality of said articles, movable means for separating the articles in said member from the articles in the hopper, guiding means for said last mentioned member, and means for holding said guiding means in a plurality of positions.

11. The structure set forth in claim 10, and an agitating means movable longitudinally of the hopper supported on said guiding means.

12. A feeding device for articles or substances having in combination, a hopper, a plate in the bottom thereof, a member having a multiplicity of holes therethrough above said plate and adapted to support articles or substances and receive some of the same in said holes, and a plate movable across the top of said member having a sharpened edge and having a recess on its undersurface whereby it is out of contact with said board at its central portion.

13. The structure set forth in claim 12, said recess extending adjacent the sharpened edge of said last mentioned plate, but being separated from said edge a distance greater than the diameter of said holes.

14. An article feeding device having in combination, a hopper, having inwardly extending ledges at the bottom of its sides, an imperforate plate slidable longitudinally in the hopper on said ledges, a member supported on said plate provided with a multiplicity of holes therethrough, a plate slidable into the hopper on said member and contacting the same adjacent its front edge and side edges, said front edge of the plate being sharpened.

15. The structure set forth in claim 8, said hopper having trunnion supports at each side adjacent its front and rear ends whereby it can be tilted or oscillated on said supports at either end thereof.

16. An article feeding device having in combination, a hopper adapted to receive a mass of articles, a removable plate at the bottom thereof, a removable tray in said hopper having rows of apertures therethrough for selecting a multiplicity of said articles and adapted to drop the same when said plate is removed, an open-work longitudinally movable agitator movable over said tray to move articles into said apertures and a thin plate insertable through the front of said hopper and slidable over said tray to separate the mass of articles in said hopper from those in said tray.

17. An article feeding device having in combination, a hopper adapted to contain a mass of articles, an apertured member therein for receiving a multiplicity of regularly spaced single articles, a plate movable into said hopper for separating the articles so received from the mass of articles in the hopper and adjustable means at the sides of said hopper forming a guide means for said plate.

18. A confectionery article feeding device having in combination, a rectangular hopper adapted to hold a mass of articles, a removable imperforate plate adapted to form the bottom thereof, a comparatively flat tray having a multiplicity of openings therethrough adapted to receive said articles therein supported on said plate, a sharp-edged thin plate longitudinally slidable into said hopper on top of said tray, a pair of longitudinally extending bars supporting said hopper at the sides thereof whereby said hopper can be lifted and dropped to assist the discharge of said articles from said tray after said first mentioned plate has been removed.

19. The structure set forth in claim 18, angle bars having vertical flanges fastened to the inner side of said hopper above said sharp-edged plate, said bars being vertically adjustable to accommodate trays of different thicknesses, and an agitator member movably supported on said angle bars.

20. An article feeding device for a candy making machine having in combination, a hopper, a perforated board adjacent the lower side thereof, a plate slidable beneath said board, a slidable plate adapted to be disposed above said board, and a member above said board comprising a series of vertical partitions extending across said hopper substantially normal to the sides thereof and adapted to hold the articles in said hopper in position when said plate above the board is moved or withdrawn.

21. The structure set forth in claim 6, a pair of angle bars secured to the bottom of said hopper and projecting forwardly therefrom, trunnions projecting laterally from each side of said hopper adjacent the front and rear thereof, and a supporting frame having forks receiving said trunnions whereby said hopper can be oscillated on said trunnions by means of said angle bars and said board and plate may be supported on said angle bars.

22. A device for simultaneously feeding a multiplicity of articles to a candy making machine having in combination, a hopper adapted to receive a mass of said articles, a flat board of comparatively small thickness having a multiplicity of comparatively small apertures therethrough supported adjacent the bottom of said hopper, said apertures being in communication with said mass of articles and said hopper having a depth several times the diameter of one of said apertures, means for separating the mass of articles in the hopper from the articles in said apertures, and a thin imperforate plate slidable under said board to support the articles disposed in said apertures and being removable to permit the discharge of said articles.

23. The structure set forth in claim 18, angle bars having vertical flanges fastened to the inner sides of said hopper above said sharp edged plate, said bars being vertically adjustable to accommodate trays of different thicknesses.

In testimony whereof I affix my signature.

FRANK MATT SCHULER.